United States Patent
Mitra et al.

(10) Patent No.: US 10,869,160 B1
(45) Date of Patent: Dec. 15, 2020

(54) SYSTEMS AND METHOD FOR INTELLIGENTLY DETECTING PROXIMITY TO LOCATIONS OF INTEREST

(71) Applicant: Verizon Patent and Licensing Inc., Arlington, VA (US)

(72) Inventors: Arindam Mitra, Duluth, GA (US); Kyle Matthew Hedden, Alpha, NJ (US); Alan Lobo, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/699,376

(22) Filed: Nov. 29, 2019

(51) Int. Cl.
| | |
|---|---|
| G06Q 30/06 | (2012.01) |
| H04W 4/021 | (2018.01) |
| H04W 64/00 | (2009.01) |
| H04W 52/02 | (2009.01) |
| H04W 4/029 | (2018.01) |

(52) U.S. Cl.
CPC .......... *H04W 4/022* (2013.01); *H04W 4/029* (2018.02); *H04W 52/0261* (2013.01); *H04W 64/006* (2013.01)

(58) Field of Classification Search
CPC .......... G06Q 30/0603; G06Q 10/1095; G06Q 20/3224; G06Q 20/3829; H04M 1/72577; H04W 4/021
See application file for complete search history.

(56) References Cited

U.S. PATENT DOCUMENTS

| | | | |
|---|---|---|---|
| 9,990,659 B2 | 6/2018 | Shanmugam et al. | |
| 10,003,925 B1* | 6/2018 | Zhao | H04W 4/027 |
| 10,187,745 B1* | 1/2019 | Zhao | H04W 4/021 |
| 10,433,107 B1* | 10/2019 | Zhao | H04W 4/021 |
| 2008/0174485 A1* | 7/2008 | Carani | G06Q 10/08 |
| | | | 342/357.46 |
| 2009/0054814 A1* | 2/2009 | Schnapp | A61B 5/1116 |
| | | | 600/595 |
| 2013/0115972 A1* | 5/2013 | Ziskind | H04W 4/21 |
| | | | 455/456.2 |
| 2014/0164118 A1* | 6/2014 | Polachi | G06Q 30/0259 |
| | | | 705/14.57 |

* cited by examiner

*Primary Examiner* — Rafael Pérez-Gutiérez
*Assistant Examiner* — Xiang Zhang

(57) ABSTRACT

A system described herein may identify proximity events using geofencing capabilities of user equipment ("UE") such as mobile phones. The UE may interact with a mobile client manager ("MCM") to identify landmarks (or "locations of interest") near the UE. The UE may identify a set of local landmarks that are nearest to the UE. The UE may utilize geofence-based location services to reduce power consumption when outside geofences associated with local landmarks. If the UE enters a geofence associated with a local landmark, the UE may utilize granular location services for increased accuracy. The UE may notify the MCM when the UE "dwells" near a given landmark by entering the geofence associated with the landmark but does not approach a threshold distance of the landmark. The UE may cease utilizing granular location services when dwelling, and may instead use location services based on push messages received from the MCM.

20 Claims, 12 Drawing Sheets

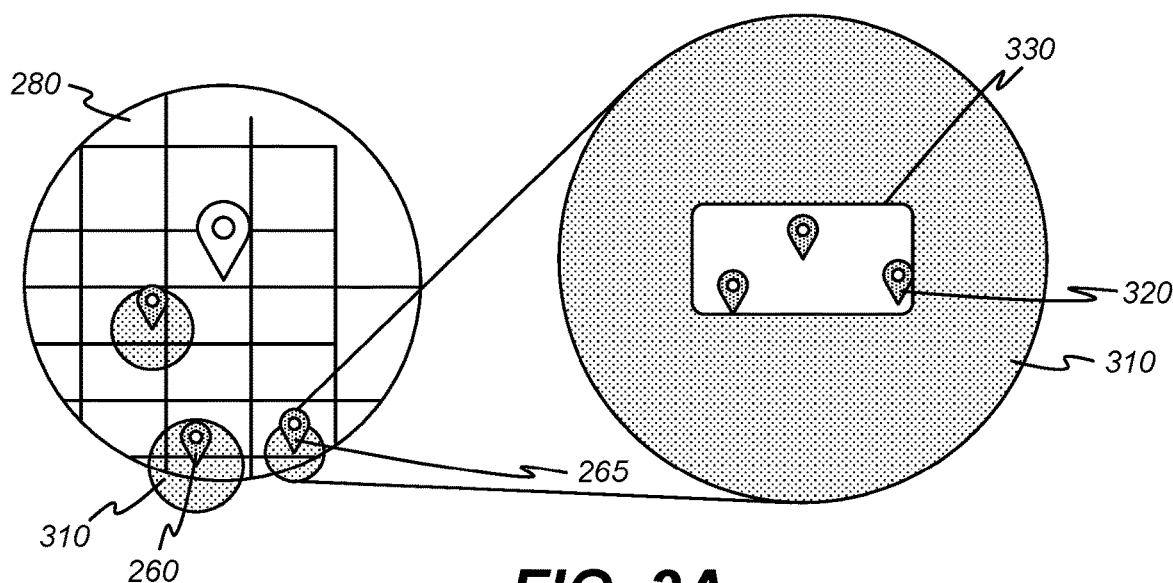
FIG. 3A
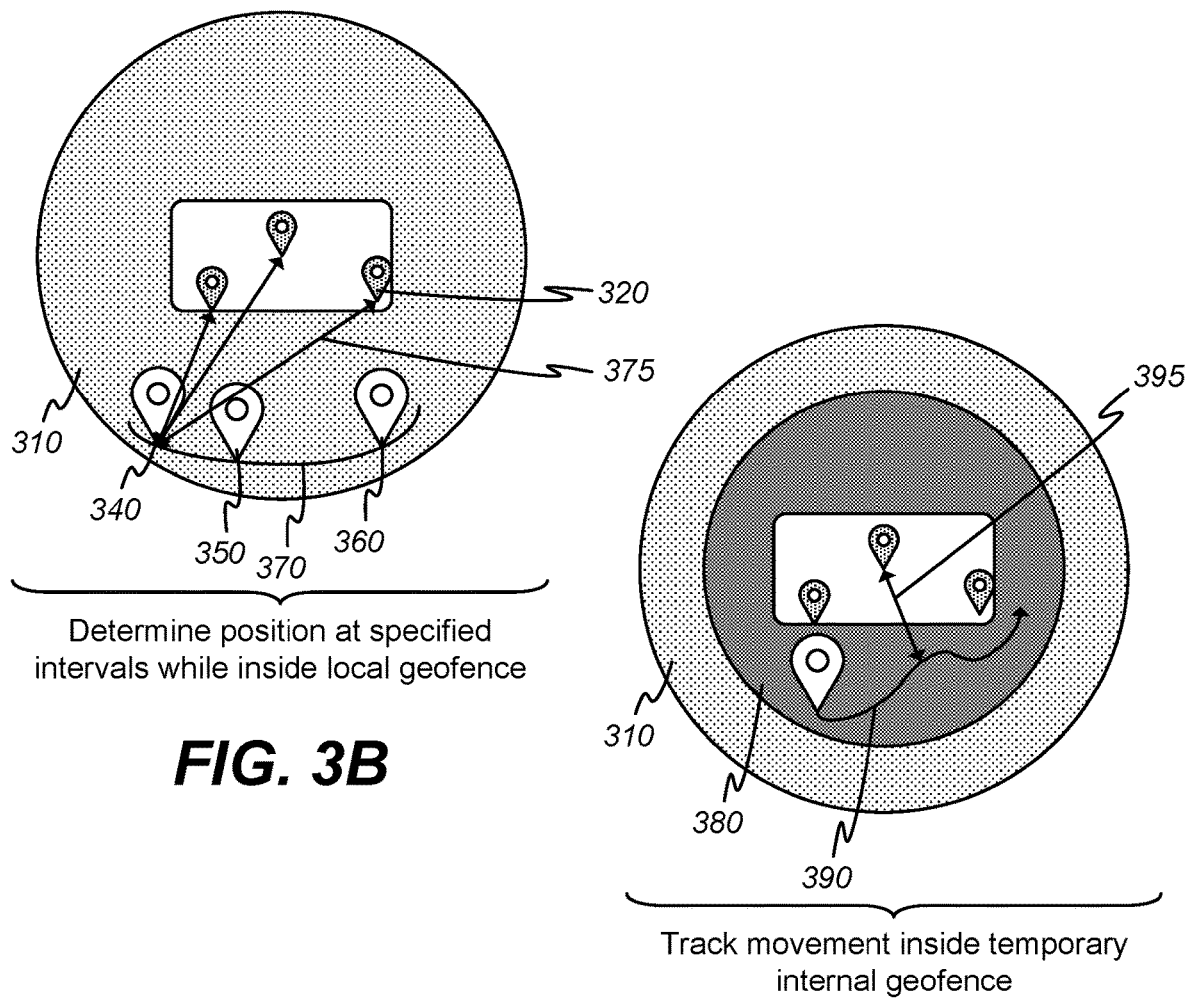
Determine position at specified intervals while inside local geofence
FIG. 3B
Track movement inside temporary internal geofence
FIG. 3C

US 10,869,160 B1

SYSTEMS AND METHOD FOR INTELLIGENTLY DETECTING PROXIMITY TO LOCATIONS OF INTEREST

BACKGROUND

Location information of User Equipment ("UE"), such as mobile telephones, can be used to identify UEs with which interaction may be desirable. UE location may be determined by dedicated proximity devices, such as fixed-location beacons.

BRIEF DESCRIPTION OF THE DRAWINGS

FIGS. 3A-3C illustrate landmark geofences within a local area and proximity tracking within a landmark geofence, in accordance with some embodiments;

DETAILED DESCRIPTION OF THE PREFERRED EMBODIMENTS

Figure 1:
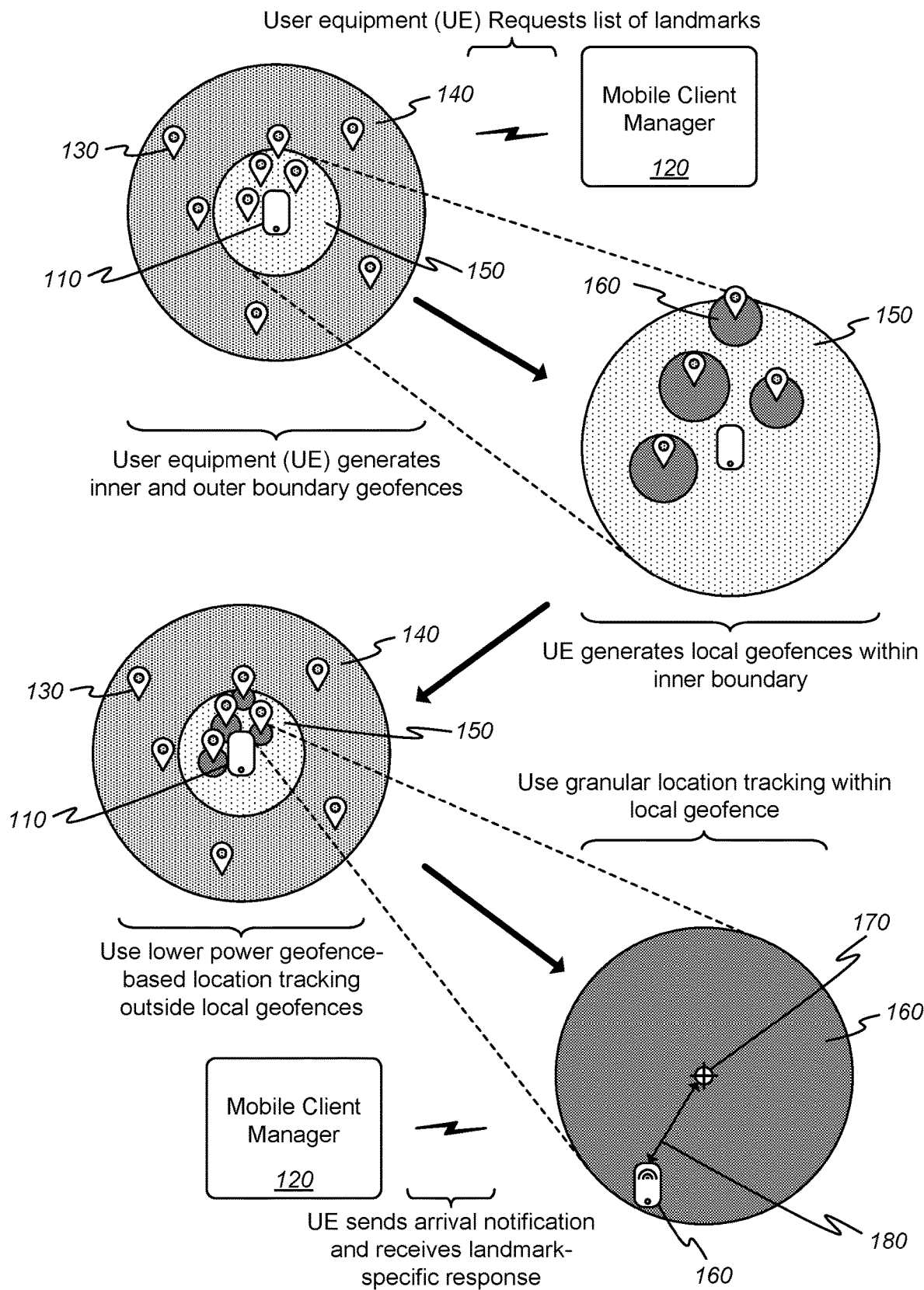
FIG. 1 illustrates selective use of geofences and location tracking to provide low-power, adaptable proximity tracking, in accordance with embodiments described herein.

The following detailed description refers to the accompanying drawings. The same reference numbers in different drawings may identify the same or similar elements.

Embodiments described herein provide techniques for identifying proximity events using geofencing capabilities of user equipment ("UE"), such as a mobile telephone and/or some other type of UE. The UE may utilize a client application or other appropriate resource to provide various features described herein.

The UE may send a request message, to a mobile client manager ("MCM"), for a list of landmarks (or "locations of interest") near the UE. The request message may include the current UE location. The request message may further include a radius or range of interest, filter criteria (e.g., the request may indicate that landmarks be associated with a specific resource or service, such as restaurants or gas stations, a specific retailer or provider, and/or other appropriate filter criteria), and/or other appropriate information.

The location of the UE may be determined using UE location services or "location tracking services." UE location services may include, for instance, UE determination of location based on received position information from a Global Positioning System ("GPS") module associated with the UE, triangulation or other calculations based on received signal strength or other appropriate parameters (e.g., transmission delay, received power, etc.) at the UE (e.g., from one or more cellular towers, Wi-Fi access points, radio frequency identification ("RFID") devices, wireless beacons, etc.), and/or other appropriate resources available to the UE. In some embodiments, the MCM and/or other external components may determine UE location or provide information that may be used to determine the location. For instance, the MCM may determine UE location based on received signal strength of the UE at one or more cellular towers or other connection points.

The MCM may send a response message that includes the list of landmarks. Alternatively, the UE may interact with another resource to generate the list of landmarks (e.g., by retrieving a previously-received list stored at the UE, by interacting with a map database, by interacting with a server associated with a retailer or other establishment, etc.). The list of landmarks may include information associated with each landmark in the list, such as a unique identifier, a location (e.g., latitude and longitude coordinates), a geofence radius, reference points or locations associated with the landmark, and/or other appropriate information (e.g., a web address of a resource associated with the landmark, proprietor information, etc.). The MCM, UE, and/or other resources may include such information in the list of landmarks.

Each landmark may be, and/or may be associated with, a physical establishment with a fixed location (e.g., a retail store, restaurant, etc.), a venue or event space (e.g., a shopping mall, a stadium, arena, park, etc.), a mobile or moveable service or platform (e.g., a food truck, temporary event stage, etc.), and/or other appropriate location.

The UE may generate a set of geofences based on the list of landmarks and/or other relevant factors. The UE may update the set of geofences at regular intervals, based on updated location or other UE information, detected geofence events, refresh request received from a user, and/or other relevant factors (e.g., expiration of one more geofences, temporal activation of one or more geofences, etc.). Such updates may include updating a center point and/or radius of a geofence, updating event trigger definitions of a geofence, etc.).

In some embodiments, geofences may be defined by a center point and radius. In some embodiments, geofences may be defined in some other way (e.g., a set of coordinates denoting a polygon), and/or may have a shape other than a circle. Geofence definitions may include various other attributes (e.g., start time, termination time, etc.). The radius or other definition of geofence range may be included in the list of landmarks (i.e., the radius may be landmark-specific), the UE may define a default range, and/or the range may be defined based on other relevant factors (e.g., user selection, type of landmark, etc.). The UE, MCM, and/or other appropriate resources may generate geofence definitions that include event trigger definitions. Such definitions may include, for instance, a distance threshold for arrival events, a time threshold for dwell events, etc.

The set of geofences may include an outer boundary geofence. The outer boundary geofence may be associated with radius or range of interest included in the request message from the UE, with a maximum distance from the location of the UE to the location of any landmark included in the list of landmarks, and/or other appropriate attributes.

The set of geofences may include an inner boundary geofence. The inner boundary geofence may be associated with a specified number of "local" landmarks. The local landmarks may be selected, by the UE, by the MCM, and/or by other appropriate resources, from the list of landmarks based on distance to the UE, with the specified number of landmarks being closest to the UE. Additionally, or alternatively, the inner boundary geofence may be set to a predetermined distance or radius from the location of the UE, and landmarks falling within the predetermined distance or radius may be considered as landmarks that are "local" to the UE.

The set of geofences may include a set of local geofences, where each local geofence is associated with a local landmark from the list of landmarks. Some embodiments may limit the number of local landmarks such that the number of geofences in use at any time is held below a specified value (e.g., some embodiments may limit the number of geofences at seventeen, which results in a maximum of fifteen local landmark geofence, the inner boundary geofence, and the outer boundary geofence).

In accordance with some embodiments, the UE, MCM, and/or other appropriate resources, may identify geofence events based on the geofence definitions and a current location of the UE. Geofence event monitoring, or "geofence-based location services", may be performed by the UE in order to minimize data transfer between the UE and other resources, and thus decrease power consumption at the UE. Such geofence events may include entry events (e.g., when a UE passes a geofence boundary such that the UE moves from a position outside the geofence boundary to a position within the geofence boundary), exit events (e.g., when a UE passes a geofence boundary such that the UE moves from a position within the geofence boundary to a position outside the geofence boundary), and dwell events (e.g., when an entry event is identified and no exit event is identified within a specified time threshold of the entry event, and/or when location information for a UE indicates that the UE is located within the geofence boundary for at least a particular duration of time).

The UE may monitor geofence events by periodically using UE location services to determine a current location and comparing the current location to one or more previous locations. The delay between each determination of current location, and thus power consumed, may be based on the radius or range of the geofence, with power consumption decreasing with an increase in geofence radius. Thus, the various geofences, in the set of geofences, may be defined such that each geofence has a radius or range that exceeds a minimum threshold (e.g., fifty to one hundred meters). During delay periods between determinations of current location, the UE may power down, deactivate, enter sleep mode, and/or otherwise reduce power consumption associated with location services (e.g., by powering down a radio associated with a GPS module of the UE).

Geofence-based location services may include geofence updates based on event detection at the UE. For instance, if an exit event is detected, by the UE, the MCM, and/or other appropriate resources, at the inner boundary geofence, a new set of local landmarks may be identified, a new inner boundary geofence may be generated, new local landmark geofences may be generated, and/or the previous inner boundary geofence and local landmark geofences may be deactivated. Similarly, if an exit event is detected, by the UE, the MCM, and/or other appropriate resources, at the outer boundary geofence is identified, all active geofences may be deactivated, a new request for a list of landmarks may be generated, and/or a new set of geofences may be defined and generated as described above.

If the UE, MCM, and/or other appropriate resource detects an entry event at a local geofence, the UE may activate "granular" location tracking services. For instance, in some embodiments, once the granular location tracking services are activated, the UE may monitor, track, report, determine, etc. its location more frequently (up to a maximum frequency of update allowed by the UE or location services thereof) when located within a local geofence area than when the UE is not located within any local geofence area. Depending on the location services used to monitor the geofence events, activation of granular location tracking services may include activating, waking, or powering up, resources such as a radio associated with a GPS module of the UE.

Granular location services may be used to track the location of the UE within the local geofence area. The UE, MCM, and/or other appropriate resources, may calculate a distance between the UE and one or more reference points associated with the local landmark. Such reference points may be associated with various appropriate features of the landmark (e.g., the center of the landmark area, an entrance or exit, point-of-sale (POS) terminal, etc.). The calculated distance(s) may be compared, by the UE, MCM, and/or other appropriate resources, to a minimum threshold distance (e.g., a few meters or less) in order to identify arrival events associated with the landmark (e.g., an arrival event may be detected when a calculated distance is less than a specified minimum threshold). If no exit event is identified within a specified time threshold of the entry event (e.g., fifteen seconds), a dwell event may be identified.

The UE may send a notification to the MCM, local landmark resource, and/or other appropriate resources upon identification of an arrival or dwell event. In addition, the UE may deactivate granular location tracking services upon identification of an arrival or dwell event. Upon detection of a dwell event, the UE of some embodiments may run a client application in background mode, put the application to sleep, and/or otherwise limit operations of the application such that power consumption is reduced (e.g., by limiting or preventing usage of GPS radio equipment).

The notification from the UE sent upon identification of an arrival or dwell event may include personal data (e.g., user account information, user location information, etc.). Such data may be transmitted and collected only upon identification of an arrival or dwell event such that user privacy is protected. Thus, private information (including location data) may only be shared when the UE is within a threshold distance of a landmark reference point (e.g., user account information may only be collected inside a physical store).

The MCM, local landmark resource, and/or other appropriate resources may respond to the event notification with landmark-specific information, content, actions, etc. For instance, if the landmark is associated with a retail store, a coupon or sales offer may be included in the response to the notification sent from the UE. The MCM or other appropriate resource may also send a notification or other appropriate message to a resource associated with the local landmark (e.g., a local server, a remote server, etc.). In some embodiments, the UE, MCM, local landmark resources, and/or other appropriate resources may utilize geofences to identify border events (e.g., entering or leaving a country) such that UE operating parameters may be updated (e.g., phone or messaging may be deactivated to prevent roaming charges, alternative modules or elements may be activated for use in a new area, etc.).

If a dwell event is detected, the MCM, local landmark resource, and/or other appropriate resource may periodically send a wakeup or probe message to the UE. Such a message may cause the UE to identify a current location of the UE and determine whether an arrival or exit event has occurred. In this way, power consumption at the UE is limited, while the MCM or other appropriate resource manages such periodic probing. Such periodic probing may be continued until an event is identified, a maximum number of probe messages has been sent, and/or other appropriate criteria.

For example, as shown in FIG. 1, UE 110 (denoted in the figure as a smartphone-style icon) may send a request to MCM 120, where the request may include the current location of UE 110. Such a current location may be determined by UE 110 (e.g., using GPS resources of UE 110). The current location may be determined by UE 110, MCM 120, and/or other appropriate devices or systems. To preserve privacy, the request may include the current location (and/or other relevant information such as desired outer boundary radius) with no other identifying information. Identifying information may be included in the request in some embodiments (e.g., based on user selection or preference, and/or other relevant factors) such that a response may be tailored to user preferences or settings.

MCM 120 may identify landmarks 130 (denoted in the figure as multiple "pin" or "pin drop"-style icons) within a proximate area 140 (as defined by a center point, corresponding to the location of UE 110, and a radius from the center point in this example) of the current location of UE 110. In some embodiments, MCM 120 may identify a minimum specified number of landmarks (e.g., in lieu of determining landmarks within a threshold distance or radius from the location of UE 110). In order to protect privacy, landmarks may be identified based only on UE location (and radius or other appropriate information) and may not utilize any personally identifying information. Personalized results may be generated by MCM 120, UE 110, and/or other appropriate resources, based on identifying information provided with consent of a user.

MCM 120 may send a response to UE 110 that includes a list of identified landmarks, information defining the proximate area 140 (e.g., center point and radius), if appropriate, and/or other relevant information. The list of landmarks may include a location of each landmark, a geofence radius or other geofence definition associated with each landmark, and/or other appropriate information. In some embodiments, UE 110 may identify landmarks by utilizing a list of previously-downloaded landmarks and/or other resources that may provide information related to landmarks or locations of interest. Landmarks may be downloaded from various resources (e.g., MCM 120, online map databases, etc.), may be based on previous interactions (e.g., based on a "check-in" action or the like), and/or may be otherwise received, retrieved, or identified.

UE 110 may generate an outer boundary geofence based on the location of UE 110 and a specified distance or boundary radius, where the outer boundary geofence is represented by outer boundary area 140. The attributes and/or parameters defining outer boundary area 140 may be included in the request from UE 110, may be based on user selection or default value, may be determined by MCM 120 based on a target number of landmarks to be identified, and/or may be based on other appropriate criteria. In some embodiments, the attributes and/or parameters defining outer boundary area 140 may be updated based on the identified landmarks (e.g., if a target quantity of landmarks is identified within a radius that is smaller than a radius specified in the request from UE 110, the response may include the smaller radius, which UE 110 may use to define outer boundary area 140).

A set of local landmarks may be generated by selecting a number of the landmarks within the outer boundary area 140 that are closest to UE 110. In this example, inner boundary area 150 includes the four closest landmarks from the list of landmarks associated with area 140. UE 110 may generate an inner boundary geofence represented by area 150. As shown, a geofence may be generated for each local landmark, as represented by areas 160. Thus, active geofences include local landmark areas 160, inner boundary area 150, and outer boundary area 140. Additional geofences may be generated (and/or existing geofences removed) dynamically, as described in more detail below.

In accordance with some embodiments, UE 110 (and/or MCM 120) may identify geofence events based on the geofence definitions and a current location of UE 110. Such events may include entry events (e.g., when a UE passes a geofence boundary such that UE 110 moves from a position outside the geofence boundary to a position within the geofence boundary), exit events (e.g., when a UE passes a geofence boundary such that UE 110 moves from a position within the geofence boundary to a position outside the geofence boundary), and dwell events. An example of a dwell event may include when an entry event is identified and no exit event is identified within a specified time threshold of the entry event, and/or when location information for UE 110 indicates that UE 110 is located within the geofence boundary for at least a particular duration of time.

Geofence events may be able to be detected using geofence-based location services in order to reduce power consumption, by limiting communications with external resources such as positioning satellites. For instance, UE 110 may periodically (e.g., at five minute intervals) determine its current location and compare the current location to geofence definitions, previous locations of UE 110, and/or other information that may be utilized to identify geofence events. According to some embodiments, an application executing at UE 110 may monitor geofence events to determine when to "wake" or perform some other predefined action.

For instance, if an exit event is associated with the inner boundary geofence, a new inner boundary geofence may be generated by identifying a new set of local landmarks based on the updated location of UE 110 and the information in the list of landmarks associated with area 140. Similarly, if an exit event is associated with the outer boundary geofence, an update request may be sent to MCM 120 (or an update performed at UE 110) based on the updated location of UE 110. In each case, previously-active geofences may be deactivated, as appropriate.

If a detected geofence event is associated with a local landmark geofence (e.g., an entry or dwell event), UE 110 may activate granular location tracking services within an area 160 associated with the local geofence. This is in contrast to geofence-based location tracking outside of a local landmark geofence area, where geofence events are identified at UE 110 with geofence-based geofence monitoring.

For instance, in some embodiments, once the granular location tracking services are activated, UE 110 may monitor, track, report, determine, or the like, its location based on location requests initiated by the UE application of some embodiments rather than utilizing only geofence event detection for location tracking services. When located within a particular local area 160, UE 110 may, in accordance with some embodiments, retrieve one or more reference points associated with the local landmark, as represented by a center point crosshairs 170 in this example. Reference point information may be retrieved from the list of landmarks included in the response from MCM 120 to UE 110, a list of landmarks identified at UE 110 by utilizing a list of previously-downloaded landmarks, and/or other appropriate list of landmarks, from a landmark resource, from MCM 120, and/or from another appropriate resource.

Reference point information may be retrieved by UE 110 if an entry event is detected at a local landmark geofence. The reference point information may be requested from a resource such as MCM 120, retrieved from a local storage of UE 110, and/or otherwise appropriately obtained. For example, reference point information may be included in the list of landmarks included in the response from MCM 120 to UE 110, a list of landmarks identified at UE 110 by utilizing a list of previously-downloaded landmarks, and/or other appropriate list of landmarks. As above, such reference point information may be provided without use of any identifying information.

Granular location tracking services may be utilized for specified durations at specified intervals in order to preserve UE battery power (e.g., location tracking may be activated for thirty seconds and deactivated for a delay interval of two minutes). To achieve increased accuracy, some embodiments may activate such granular location tracking until an appropriate event is identified or some other timeout period is reached. UE location may be tracked at UE 110, using location tracking modules included in UE 110. UE location may be tracked at a resource such as MCM 120.

During granular location tracking, a distance 180 may be calculated from UE 110 to one or more reference points 170. Distance 180 may be calculated by UE 110, MCM 120, and/or other appropriate resources. If the calculated distance is less than a specified proximity threshold (e.g., a few meters or less), then UE 110, MCM 120, and/or other appropriate resources may determine that an arrival event, associated with reference point 170, has occurred.

Granular location tracking data may be utilized by UE 110, MCM 120, and/or other appropriate resources, to monitor a movement path of UE 110 and generated a predicted path or predicted probability of a geofence event. For instance, granular data may indicate that the distance 180 from UE 110 to reference point 170 is decreasing, which may cause the probability of an arrival event associated with the reference point 170 to be increased. As another example, granular data may indicate that the distance 180 from UE 110 to reference point 170 is increasing, which may cause the probability of an arrival event associated with the reference point 170 to be increased. Similarly, granular data may be utilized to predict a movement path (e.g., using straight line extrapolation from two granular locations), which may cause the probability of an event to be adjusted (e.g., if the predicted path passes within a threshold distance of a reference point, the probability of an event associated with that reference point may be increased).

If an arrival event is detected, UE 110 may deactivate granular location tracking. UE 110 may send an arrival notification to MCM 120 if an arrival event is detected. MCM 120 may generate a response to the arrival notification. The response may include, for example, landmark-specific information (e.g., reference point information, network connection information, etc.), offers, content, etc. The response may include instructions or content that may at least partly control information or user interface elements provided by a client application of some embodiments.

If a dwell event is detected, UE 110 may send a dwell notification to MCM 120 and deactivate granular location tracking. When a dwell event has been indicated, MCM 120 may provide (e.g., on a periodic or intermittent basis) push messages to UE 110. Based on receipt of such push messages, UE 110 may activate granular location tracking and/or otherwise update location information in order to identify location events (e.g., whether an arrival event has occurred). Such push messages may be repeated at regular intervals until a location event is identified or until a threshold number of messages has been exceeded.

If UE 110 exits a geofence associated with a local landmark area 160, UE 110 may, in accordance with some embodiments, deactivate granular location tracking. In order to reduce power consumption, granular location tracking may be disabled if no exit event is detected within a specified timeout period. In some embodiments, an arrival notification may be sent from UE 110 to a resource associated with the landmark (e.g., a local server, beacon, etc.), in order to activate local proximity tracking services, if available. Information related to such landmark resources may be included in (and received or retrieved from) the list of landmarks included in the response from MCM 120 to UE 110, a list of landmarks identified at UE 110 by utilizing a list of previously-downloaded landmarks, and/or other appropriate list of landmarks. For instance, if UE 110 is inside a building with poor reception, local beacons, networks, and/or other resources may be utilized to track location and/or identify events. Such local location services may be provided via interaction between UE 110 and a beacon (e.g., by receiving a beacon signal indicating a location of the beacon), interaction among UE 110 and other landmark resources, or the like. As an example of local location services, UE 110 may identify a name of a local area network and provide the name to a resource such as MCM 120 in order to determine whether a UE is located within a transmission range of some landmark resource.

As above, granular location tracking and local event detection and response may be performed by UE 110, MCM 120, and/or other appropriate resources without use of personal or private information. Such an approach allows landmark-specific content to be distributed to proximate UEs 110 without requiring collection or use of private or personal information.

FIGS. 2A-2D illustrate definition and use of geofences associated with inner and outer boundary areas. As shown FIG. 2A, an outer boundary 220 may be generated based on a UE location (denoted in the figure as a "pin" or "pin drop"-style icon 210) and a specified boundary radius (e.g., eighty kilometers, in this example), denoted in the figure as arrow 230. In this example, various geographic features 240 (e.g., roadways, waterways, borders or boundaries, etc.) are shown, but some embodiments may not have access to such data and/or may not utilize such data.

Figure 2A:
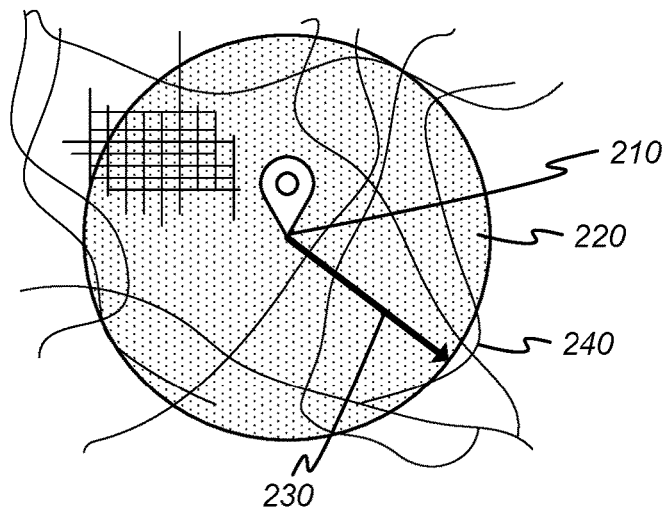
FIGS. 2A-2D illustrate use of geofences to identify proximity events associated with local landmarks, in accordance with embodiments described herein.
Figure 2B:
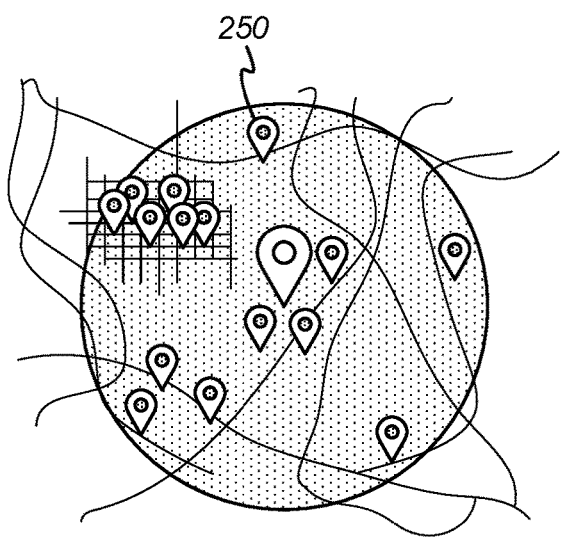

As shown in FIG. 2B, UE 110 may identify a set of landmarks within outer boundary 220. For illustrative purposes, the landmarks are depicted in this figure by a set of "pin" or "pin drop"-style icons 250, which are smaller in size than the "pin" or "pin drop"-style icon 210 that represents UE 110. Based on a location provided by UE 110, MCM 120 may retrieve or identify information indicating all landmarks located within outer boundary 220.

The landmarks may include dynamic landmarks that are temporary or created on-demand, such as mobile or "pop-up" landmarks (e.g., landmarks that are associated with a vehicle and/or a temporary location). Such dynamic landmarks may include expiration times. UE 110 may request a new list of landmarks after a current list has expired (or a significant number (e.g., a number that exceeds a threshold) of dynamic landmarks has expired). UE 110 may request a new list of landmarks at regular intervals (e.g., every hour, every day, every week, etc.), regardless of whether UE 110 has exited an outer boundary geofence. In some embodiments, dynamic landmarks may be received from MCM 120 via push notification (i.e., such landmarks may be identified or otherwise enabled at MCM 120, which may send push notifications to any UEs within a radius of the updated landmarks). Such push notifications may cause the landmark list at UE 110 to be updated.

Figure 2C:
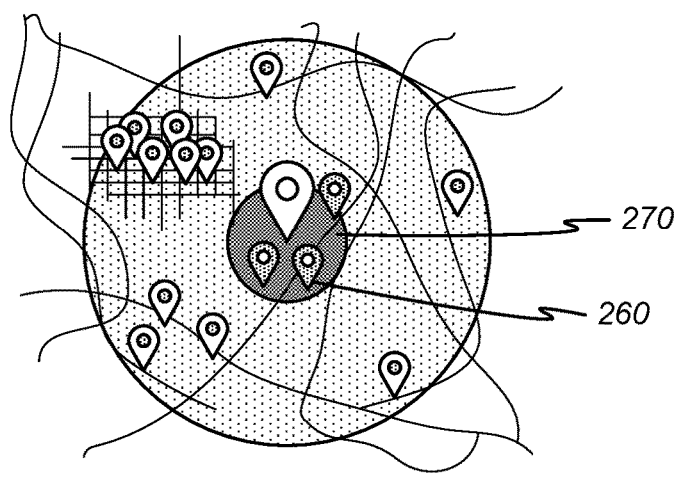

As shown in FIG. 2C, a subset of the landmarks (i.e., three landmarks, in this example) identified by MCM 120 may be designated as "local" landmarks, denoted in the figure by three shaded "pin" or "pin-drop" style icons 260. Such local landmarks may be the closest landmarks to the UE location 210. MCM 120 and/or UE 110 may specify a number of landmarks to designate as local landmarks (e.g., three in this example) and the radius of the inner boundary area 270 may be set such that the designated number of local landmarks is included within the inner boundary.

Figure 2D:
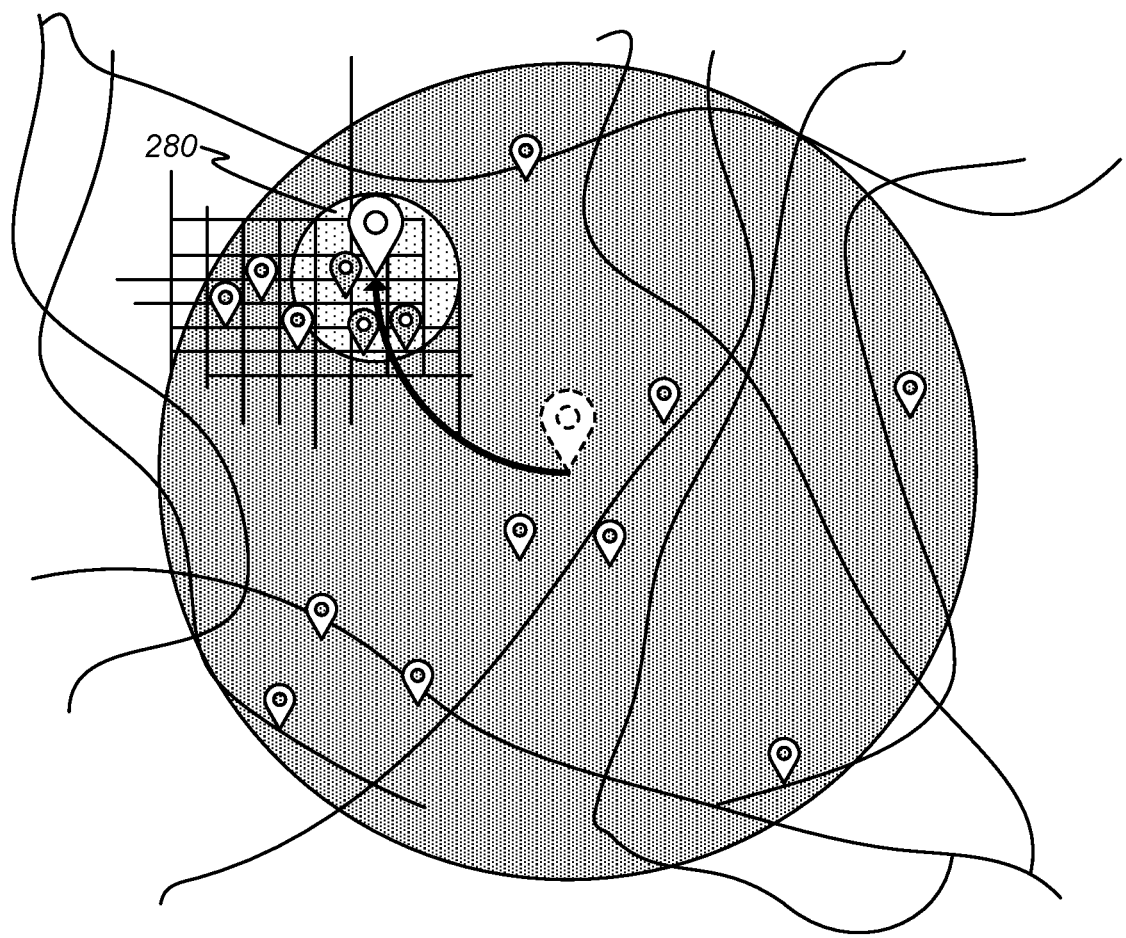

FIG. 2D illustrates an updated inner boundary 280 based on UE location change within the outer boundary area 220. As shown (and as denoted by the arrow from the dotted "pin"-style icon to the solid "pin"-style icon, indicating the movement of UE 110 from its previous location to its new location), UE 110 has moved to an area that is more densely populated with landmarks. As such, the radius of the update inner boundary 280 is smaller than the radius of the original inner boundary 270, but still includes the same number of local landmarks 260 (i.e., three in this example).

FIG. 3A illustrates landmark geofences within inner boundary 280, in accordance with some embodiments. In this example, each local landmark 260 is associated with a local geofence area 310. Further, as shown, in the enlarged view for a particular one of the illustrated local geofence areas 310, each local landmark 260 may be associated with multiple reference points 320. Such reference points 320 may be associated with various features of the landmark (e.g., an entrance, an exit, payment register, sign, multimedia display, etc.). In this example, local landmark 265 is associated with area 330, which may represent a physical structure (e.g., building) associated with local landmark 265.

FIG. 3B illustrates granular location tracking within example local geofence area 310. "Pin"-style icons 340, 350, and 360 in this figure indicate example locations of UE 110 over a duration of time. As shown, the UE location may be determined at position 340, position 350, and subsequently at position 360 along path 370. The granular location determination may occur on a more frequent basis (e.g., every five seconds) than in other scenarios (e.g., when UE 110 is located outside of local geofence area 310, when UE 110 has not detected a location event (e.g., entry, exit, or dwell) for at least a threshold period of time, etc.). As described above, UE 110 may activate granular location tracking for a specified time interval (e.g., thirty seconds) and deactivate granular location tracking for a specified "delay" interval (e.g., two-and-a-half minutes, five minutes, etc.) such that power consumption may be reduced. The delay interval may be increased or reduced depending on various relevant factors (e.g., speed of movement, direction of movement, distance from UE to landmark, etc.).

Using the granular location tracking information, distances 375 to each reference point 320 may be calculated and compared to a minimum threshold distance for each reference point. If UE 110 is within the specified threshold distance, an arrival event may be identified at UE 110. Thus, geofence events may be used to track location of UE 110 until a local area geofence entry is detected, at which point granular location tracking may be utilized such that arrival events may be detected with increased precision as compared to geofence tracking. Activating granular location tracking services only when UE 110 is close to a landmark allows for precise detection of arrival events (with the most accurate location detection of UE 110) without consuming the power that would be required to use granular tracking alone without activation and deactivation based on geofence events. If an arrival event is identified, UE 110 may send a notification to MCM 120 and may disable granular location tracking in order to preserve UE battery power.

In some embodiments, UE 110 and/or MCM 120 may generate a probability or other measure indicating a confidence that an arrival event will occur. For instance, if the calculated distance between UE 110 and a reference point 320 is decreasing, arrival probability may be increased. Conversely, if the calculated distance is increasing, arrival probability may be decreased. The calculated probability may be used by UE 110 and/or MCM 120 to determine whether an arrival is likely to occur or has occurred. The probability may be compared to a threshold value by UE 110 or MCM 120 and if the threshold value is exceeded, granular location tracking may be activated, and arrival event identified, push message(s) scheduled, delay interval decreased, and/or other appropriate actions may be performed.

Granular location tracking may be limited to a specified time period (e.g., two minutes, five minutes, etc.). If no arrival event is identified within the specified time period (and no exit event is identified), a "dwell" event may be identified, and UE 110 may deactivate granular location tracking (or the delay interval may be increased, arrival probability reduced, etc.).

FIG. 3C illustrates location tracking within an internal local geofence associated with area 380. Such internal local geofences may be activated temporarily (e.g., until an arrival or exit event is detected) such that the total number of active geofences is limited to below a desired threshold (e.g., twenty active geofences). In some embodiments, geofence definitions may be limited to a minimum radius (e.g., one hundred meters) such that less power is used in probing for location information and/or identifying geofence events, thus saving UE battery life. Temporary internal local geofences may be used to define smaller areas of interest around landmarks. An internal local geofence area 380 may have a radius half that of an associated local geofence area 310 in some embodiments.

Within such a temporary internal local geofence 380, as shown in FIG. 3C, location tracking of UE 110 may be utilized with no delay interval (i.e., granular location tracking may not be deactivated until an event is identified or some other deactivation criteria are met). Thus, UE location 390 may be tracked with increased precision while within the temporary internal local geofence 380. In addition, a distance 395 between UE location 390 and any reference points 320 may be calculated with no delay interval, such that arrivals may be determined with relatively high temporal accuracy and/or precision. In contrast, granular location tracking where no temporary inner geofence is enabled, as shown in FIG. 3B, may be activated and deactivated such that data is collected at discrete intervals (e.g., corresponding to locations at or near positions 340, 350, and 360).

Figure 4:
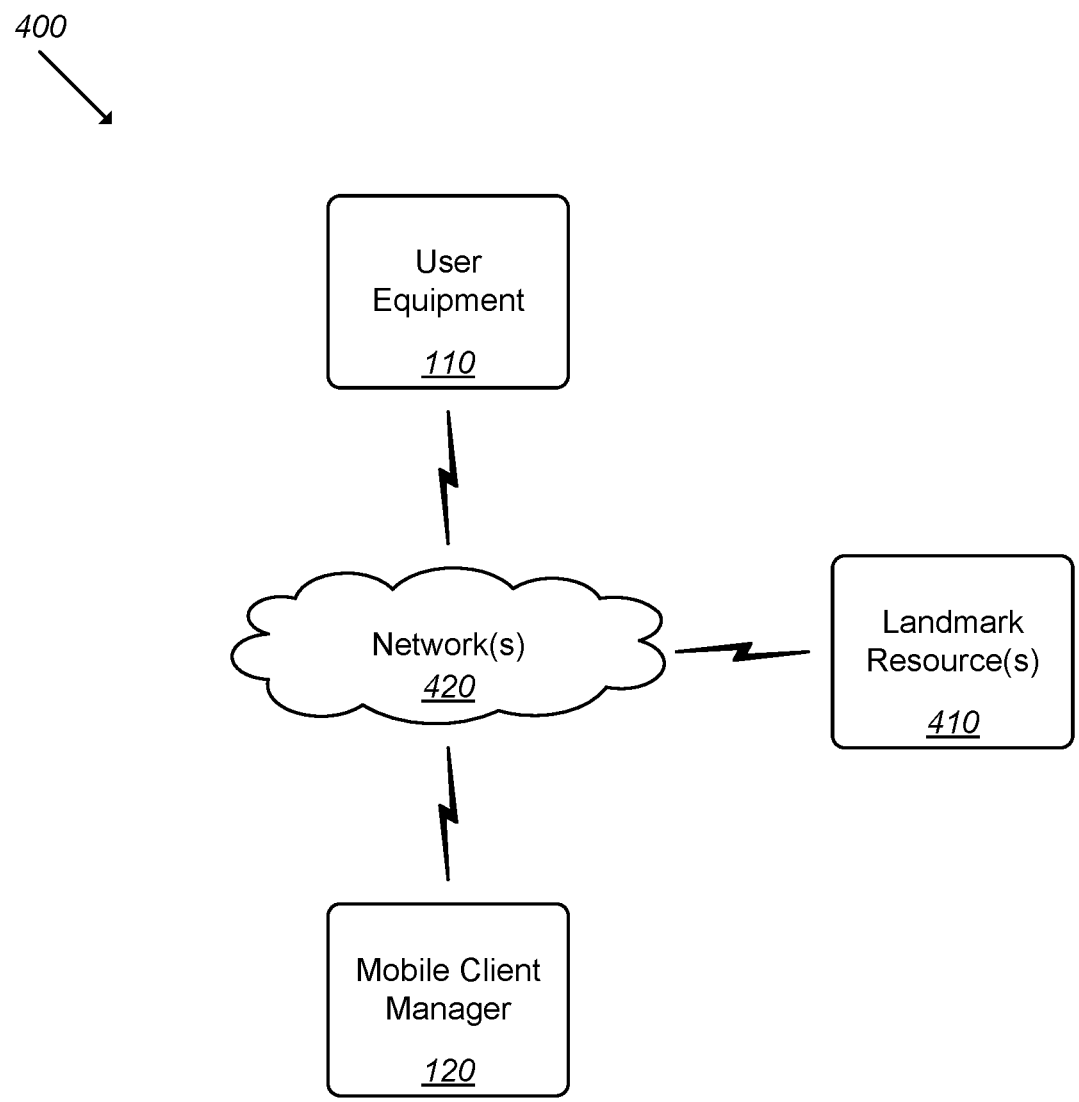
FIG. 4 illustrates an example environment in which one or more embodiments, described herein, may be implemented.

FIG. 4 illustrates an example environment 400 in which one or more embodiments, described herein, may be implemented. As shown, environment 400 may include one or more UEs 110, MCM 120, landmark resources 410, and network 420. The quantity of devices and/or networks, illustrated in FIG. 4, is provided for explanatory purposes only. In practice, environment 400 may include additional devices and/or networks; fewer devices and/or networks; different devices and/or networks; or differently arranged devices and/or networks than illustrated in FIG. 4. For example, while not shown, environment 400 may include devices that facilitate or enable communication between various components shown in environment 400, such as routers, modems, gateways, switches, hubs, etc. Alternatively, or additionally, one or more of the devices of environment 400 may perform one or more functions described as being performed by another one or more of the devices of environments 400. Devices of environment 400 may interconnect with each other and/or other devices via wired connections, wireless connections, or a combination of wired and wireless connections. In some implementations, one or more devices of environment 400 may be physically integrated in, and/or may be physically attached to, one or more other devices of environment 400.

UE 110 may include any computation and communication device that is capable of communicating with one or more networks (e.g., network 420). For example, UE 110 may include a device that receives content, such as web pages (e.g., that include text content and/or image content), streaming audio and/or video content, and/or other content, via an Internet connection and/or via some other delivery technique. UE 205 may also receive user interactions (e.g., voice input, touches on a touchscreen, "clicks" via an input device such as a mouse, etc.). In some implementations, UE 110 may be, or may include, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

MCM 120 may include one or more devices (e.g., a server device or a distributed set of devices, such as a cloud computing system) that perform one or more actions described herein. For example, MCM 120 may manage landmark information, generate and utilize geofences, monitor and/or identify geofence events, and provide notifications or other data to UE 110.

Landmark resources 410 may include one or more devices (e.g., a server device or a distributed set of devices, such as a cloud computing system) that provide or facilitate operation of various applications, browser content, etc. that may be provided to UE 110 via network 420. The landmark resources 410 may be associated with one or more landmarks. For instance, the landmark resources may include resources associated with a retailer having multiple establishments (e.g., sale information, current specials, etc.). As another example, a landmark resource may be associated with a single establishment and may allow a customer to identify available goods, select items for purchase, process payments, etc. In some embodiments, a landmark resource may be physically located at a landmark and be accessible over a local wireless connection.

Network 420 may include one or more radio access networks ("RANs"), via which UEs 110 may access one or more other networks or devices, a core network of a wireless telecommunications network, an IP-based packet data network ("PDN"), a wide area network ("WAN") such as the Internet, a private enterprise network, and/or one or more other networks. In some implementations, network 420 may be, include, or be in communication with a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. User device 110 may connect to, and/or otherwise communicate with, via network 420, data servers, application servers, other UEs 110, etc. Network 420 may be connected to, and/or otherwise in communication with, one or more other networks, such as a public switched telephone network ("PSTN"), a public land mobile network ("PLMN"), and/or another network.

Figure 5:
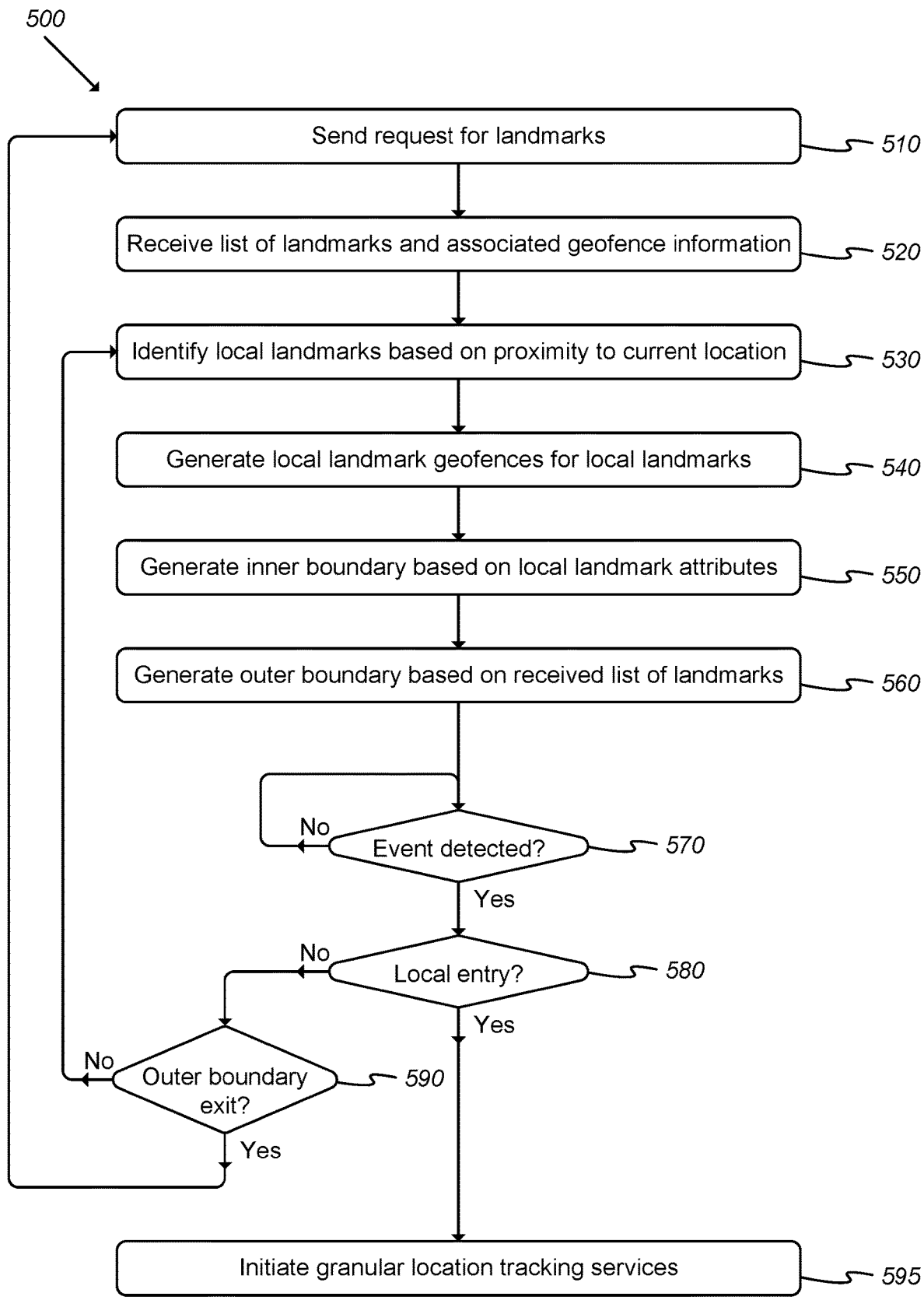
FIG. 5 illustrates an example process by which geofences associated with a set of landmarks may be generated and utilized to provide proximity-based services.

FIG. 5 illustrates an example process 500 by which geofences associated with a set of landmarks are generated and utilized to provide proximity-based services. As described herein, geofences may be utilized to identify and respond to proximity events. Process 500 may be performed when an application of some embodiments is launched, at regular intervals during UE use, and/or at other appropriate times. In some embodiments, process 500 may be performed by UE 110. In some embodiments, process 500 may be performed by one or more other devices in addition to, or in lieu of, UE 110. Furthermore, in some embodiments a complementary process may be performed by other devices, such as MCM 120, landmark resources 410, etc.

As shown, process 500 may include sending (at 510) a request for landmarks or locations of interest. UE 110 may send such a request to MCM 120. Alternatively, UE 110 may process the request using local data and resources (e.g., by utilizing a previously downloaded lookup table of landmark information). The request may include a current location of UE 110, an outer boundary radius, a number of local landmarks, and/or other appropriate information. The current location of UE 110 may be determined using location services associated with UE 110, and/or using other appropriate resources. The outer boundary radius, number of local landmarks, and other information may be provided in various appropriate ways (e.g., as default values of the application or MCM of some embodiments, based on user selection, regional attributes, area type, expected density of landmarks, device capabilities such as memory, etc.).

The request may include user-specific information in some embodiments (e.g., user account information such as username and/or password, rewards balance or membership information, and/or other appropriate information). Such user information may be encrypted and/or otherwise protected such that the data is not exposed to external parties.

Process 500 may receive (at 520) a list of landmarks and associated geofence information. Each landmark may be associated with a location or center point and a radius that define a geofence. A default radius may be utilized if none is specified for a particular landmark. Each landmark may further be associated with a set of reference points (e.g., a center point of the landmark, an entrance, etc.). Such reference points may each be associated with a location (e.g., as specified using GPS coordinates), a minimum distance threshold (or "arrival distance"), and/or other appropriate information. The process may also receive various offers, notifications, and/or other landmark-specific materials that may be utilized depending on event identification, user preference, etc.

The process may identify (at 530) local landmarks based on proximity to the current location. Process 500 may calculate a distance to each landmark in the list of landmarks based on the location of each landmark and the current location of UE 110. The list of landmarks may be sorted by the calculated distance in order to identify a sub-set of landmarks that are within a local area. The process may select a number of local landmarks from the sorted list of landmarks (e.g., four, five, ten, etc.). If two or more landmarks have a same calculated distance, a random or default selection may be made such that the desired number of local landmarks is identified.

Process 500 may include generating (at 540) local landmark geofences for the local landmarks identified at 530. Each local landmark geofence may be generated using the landmark center point and radius. Alternatively, a default or user-specified radius may be used. Such geofences may be generated by supplying the center point and radius information to the UE operating system (and/or other appropriate information for defining the geofences).

The process may generate (at 550) an inner boundary geofence based on local landmark attributes. A center point and radius for the inner boundary geofence may be calculated based on the locations (and/or other attributes) of the local landmarks. The radius may be calculated such that each center point of each local landmark is within the radius. The process may calculate the radius such that the inner boundary completely encloses each of the local landmark geofences. In some embodiments, equations (1)-(4) below, may be used to calculate the inner boundary radius, R, where $D_{CLOSEST}$ is the distance of the closest non-local landmark (i.e., the closes landmark within the outer boundary area that is not included in the set of local landmarks), $D_{LOCAL\_FARTHEST}$ is the distance of the farthest local landmark, and all distances are positive values, and $\mu$ is a coefficient between zero and one that defines how far the radius of the inner boundary geofence extends past $D_{LOCAL\_FARTHEST}$ toward $D_{CLOSEST}$.

$$R = D_{LOCAL\_FARTHEST} + \mu \cdot (D_{CLOSEST} - D_{LOCAL\_FARTHEST}); \text{ where } D_{CLOSEST} > D_{LOCAL\_FARTHEST} \quad (1)$$

$$R = \mu \cdot D_{LOCAL\_FARTHEST}; \text{ where } D_{CLOSEST} = D_{LOCAL\_FARTHEST} \quad (2)$$

$$R = D_{LOCAL\_FARTHEST}; \text{ where one landmark is inside outer boundary area} \quad (3)$$

$$R = R_{OUTER\_BOUNDARY}; \text{ where no landmarks are inside outer boundary area.} \quad (4)$$

Process 500 may include generating (at 560) an outer boundary based on the received list of landmarks. A center point and radius for the outer boundary geofence may be calculated based on the current location of UE 110 and the radius specified in the request for locations of interest.

The process may determine (at 570) whether a geofence event has been detected. Such events may include entry, exit, and dwell events. If no event is detected, the process may continue monitoring the geofence status(es) until an event is detected. As described above, such event detection may utilize only geofence-based location services.

If an event is detected (at 570), the process may determine (at 580) whether the event is associated with entry to a local geofence (i.e., a geofence associated with a local landmark). If the process determines (at 580) that the event is not associated with a local geofence entry, the process may determine (at 590) whether the event was an outer boundary exit. If the process determines that the event was not an outer boundary exit (i.e., the event was an inner boundary exit), the process may identify (at 530) a new set of local landmarks based on the new current location.

If the process determines (at 590) that the event was an outer boundary exit, the process may send (at 510) a new request for locations of interest that includes the updated current location. Dwell events associated with the inner or outer boundaries may be ignored or disabled in some embodiments.

If the process determines (at 580) that the event is a local entry event, the process may initiate (at 595) granular location tracking services. Examples of such granular location tracking services are described in more detail in reference to FIGS. 6 and 7 below.

Figure 6:
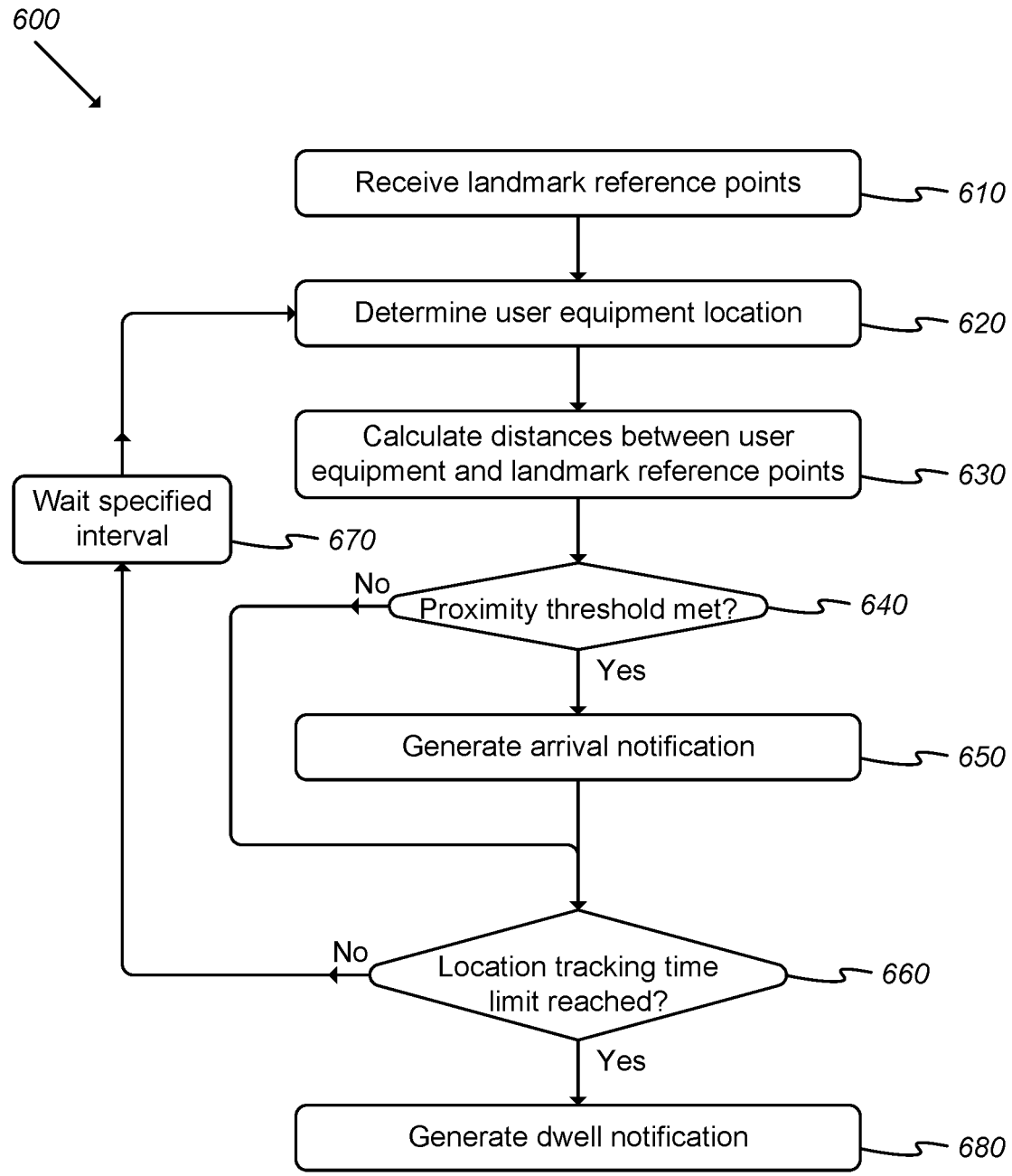
FIG. 6 illustrates an example process by which position data is collected and compared to landmark reference points to identify proximity events.

FIG. 6 illustrates an example process 600 by which position data is collected and compared to landmark reference points to identify proximity events. As described herein, location or position data may be collected at specified time intervals while a user device is inside a landmark geofence. Process 600 may be performed when a local tracking event of some embodiments is identified and/or at other appropriate times. In some embodiments, process 600 may be performed by UE 110. In some embodiments, process 600 may be performed by one or more other devices in addition to, or in lieu of, UE 110. Furthermore, in some embodiments a complementary process may be performed by other devices, such as MCM 120, landmark resources 410, etc.

As shown, process 600 may include receiving (at 610) landmark reference points for the landmark associated with the local geofence entry, such as reference points 320 described above. Such reference points may be received from MCM 120 or may be retrieved from local storage at UE 110, if available. Each reference point may be associated with a location and a minimum distance threshold.

The process may determine (at 620) UE location. The location may be determined using GPS resources or other appropriate ways. Process 600 may calculate (at 630) distances between UE 110 and each of the landmark reference points.

Process 600 may determine (at 640) whether a proximity threshold has been met (i.e., whether the distance between UE 110 and one of the landmark reference points is less than the specified minimum distance threshold). If the process determines (at 640) that the threshold has been met, the process may generate (at 650) an arrival notification. The arrival notification may be provided at UE 110 (e.g., as a check-in opportunity, as an offer or coupon, etc.). UE 110 may generate a notification message and send the message to MCM 120. MCM 120 may generate a response using a process such as process 1000 described below.

The process may determine (at 660) whether a location tracking time limit has been reached. For instance, as described above, some embodiments may limit location tracking to a specified time period (e.g., two-and-a-half minutes, five minutes, etc.) in order to limit power consumption. If the process determines (at 660) that the tracking time limit has not been reached, the process may wait (at 670) some specified time interval (e.g., thirty seconds) before determining (at 620) an updated location, calculating (at 630) distances, and determining (at 640) whether a proximity threshold has been met.

The specified wait interval, or delay interval, may be varied depending on the location determined at 620. For instance, granular location tracking services may initially be activated at UE 110 for a thirty second tracking interval and deactivated for a two-and-a-half minute delay interval. During the tracking interval, location and movement information may be collected. The granular location tracking services tracking interval and/or delay interval may be adjusted based on the collected location and/or movement information. For instance, if a distance to a reference point is decreasing over time, the delay interval may be reduced and/or the tracking interval may be increased. As another example, a probability of arrival may be calculated based at least partly on location and movement information. For instance, a user associated with a UE 110 may be walking at a consistent speed in a particular direction during a tracking interval and may be predicted to continue along a similar path at a similar speed during the delay interval.

If the process determines (at 660) that the location tracking time limit has been reached, the process may generate (at 680) a dwell notification and send the notification to MCM 120. Dwell notifications may be managed using a process such as process 800 described below. In addition to sending the notification, some embodiments may discontinue tracking location after the location tracking time limit has been reached. In some embodiments, location tracking may be automatically disable once the location tracking time limit is exceeded. The location tracking time limit may be reset based on event identification, periodic update, and/or under other appropriate circumstances.

Figure 7:
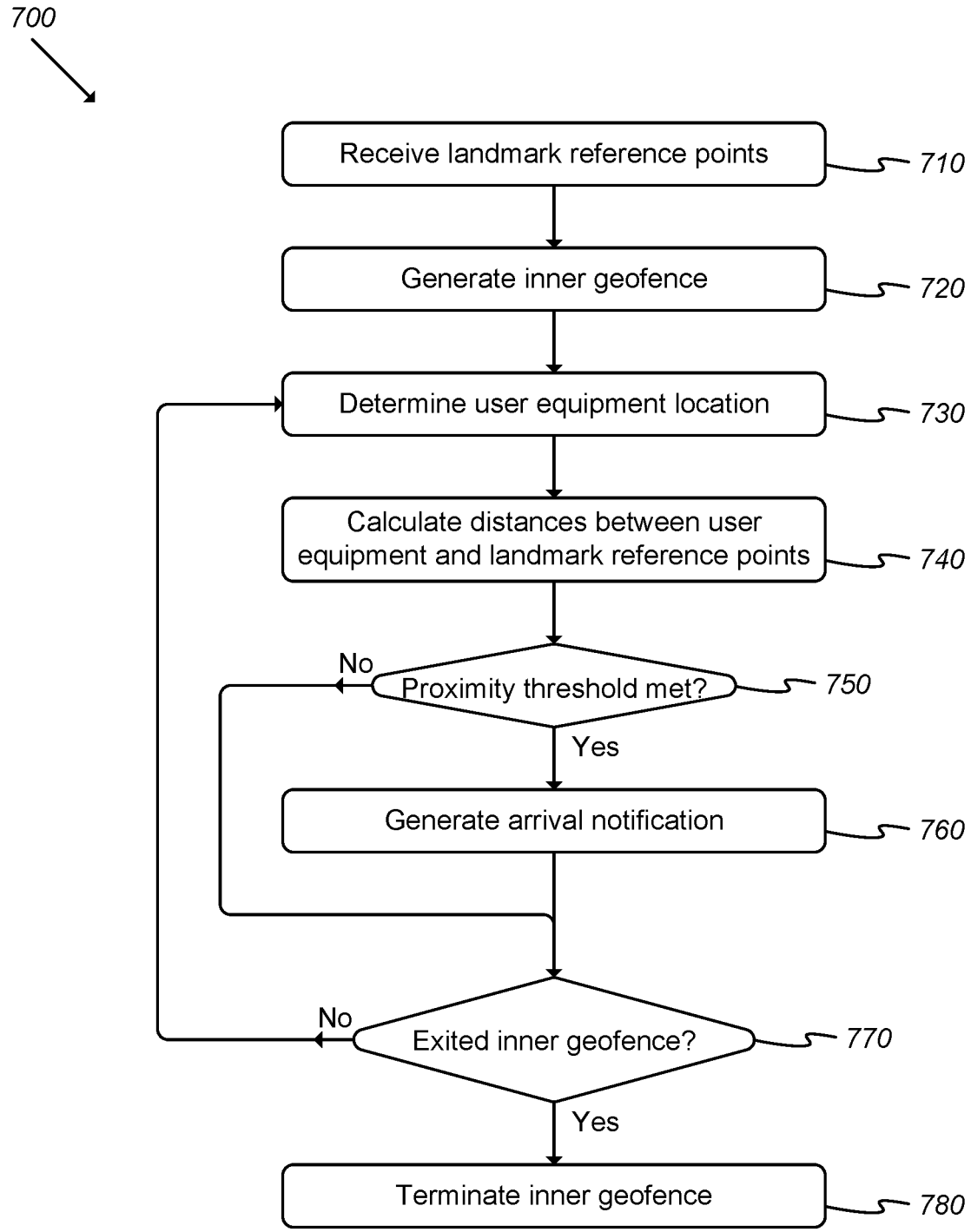
FIG. 7 illustrates an example process by which position data is collected and compared to landmark reference points to identify proximity events.

FIG. 7 illustrates an example process 700 by which position data is collected and compared to landmark reference points to identify proximity events. As described herein, location or position data may be collected continuously (or at relatively small specified time intervals) while a user device is inside a landmark inner geofence. Process 700 may be performed when an entry event at an inner geofence of some embodiments is identified and/or at other appropriate times. In some embodiments, process 700 may be performed by UE 110. In some embodiments, process 700 may be performed by one or more other devices in addition to, or in lieu of, UE 110. Furthermore, in some embodiments a complementary process may be performed by other devices, such as MCM 120, landmark resources 410, etc.

As shown, process 700 may include receiving (at 710) landmark reference points for the landmark associated with the local geofence entry, such as reference points 320 described above. Such reference points may be received from MCM 120 or may be retrieved from local storage at UE 110, if available. Each reference point may be associated with a location and a minimum distance threshold.

Process 700 may generate (at 720) an inner geofence. The inner geofence may be generated with the same center point as the inner boundary geofence. The radius of the inner geofence may be smaller than the radius of the inner boundary geofence (e.g., fifty meters versus one hundred meters).

The process may determine (at 730) UE location. The location may be determined using GPS resources or other appropriate ways. Process 700 may calculate (at 740) distances between UE 110 and each of the landmark reference points.

Process 700 may determine (at 750) whether a proximity threshold has been met (i.e., whether the distance between UE 110 and one of the landmark reference points is less than the specified minimum distance threshold). If the process determines (at 750) that the threshold has been met, the process may generate (at 760) an arrival notification. The arrival notification may be provided at UE 110 (e.g., as a check-in opportunity, as an offer or coupon, etc.). UE 110 may generate a notification message and send the message to MCM 120. MCM 120 may generate a response using a process such as process 1000 described below.

The process may determine (at 770) whether the inner geofence has been exited. Such a determination may be made based on event data received from the UE operating system. If the process determines that the inner geofence has not been exited, the process may update (at 730) UE location information. Such location update may be performed at rapid intervals (e.g., less than one second), as compared to the intervals used outside the inner geofence.

If the process determines (at 770) that the inner geofence has been exited, the process may terminate (at 780) the inner geofence. In such cases, some embodiments may execute a process such as process 600 to perform local tracking without use of an inner geofence.

Figure 8:
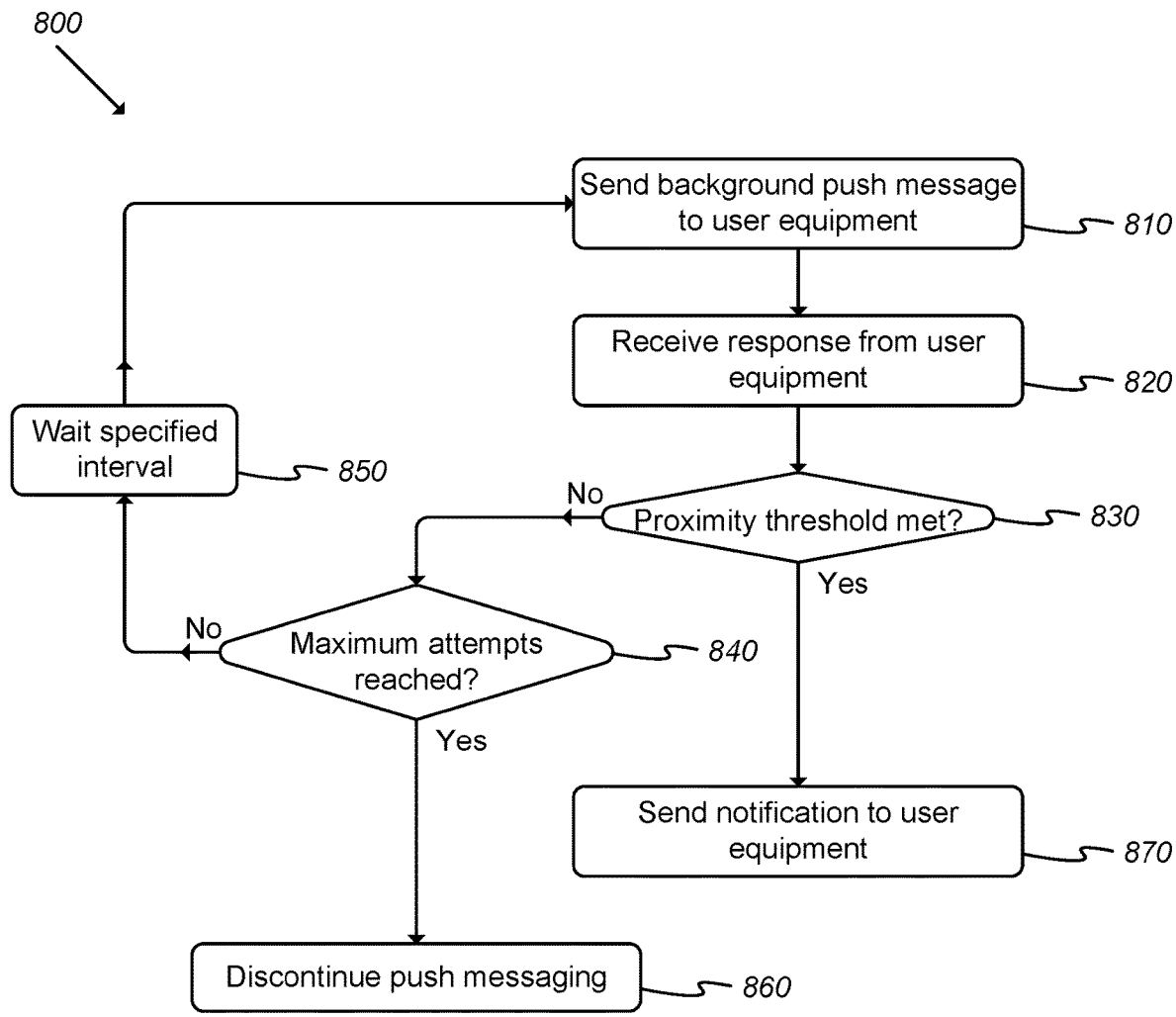
FIG. 8 illustrates an example process by which wakeup messages are generated and sent to a UE based on a previously-identified dwell event.

FIG. 8 illustrates an example process 800 by which wakeup messages are generated and sent to a UE based on a previously-identified dwell event. As described herein, MCM 120 may send a specified number of wakeup messages to a UE that has been associated with a dwell event at a particular landmark. Process 800 may be performed when an entry event at an inner geofence of some embodiments is identified but no arrival event is identified before a tracking time limit threshold is exceeded and/or at other appropriate times. In some embodiments, process 800 may be performed by MCM 120. In some embodiments, process 800 may be performed by one or more other devices in addition to, or in lieu of, MCM 120. Furthermore, in some embodiments a complementary process may be performed by other devices, such as UE 110, landmark resources 410, etc.

As shown, process 800 may include sending (at 810) a background push message to UE 110. The background push message may include a payload that includes a landmark identifier and/or information related to the geofence under consideration. The background push message may be generated based on a dwell notification, which may be interpreted as an indication that a UE is possibly at a landmark. This is as opposed to an arrival notification where a UE is definitely at the landmark (as specified by the distance threshold).

The push message may be received at UE 110, where a client application of some embodiments may poll the location of UE 110 in the background (i.e., without notifying the user or disrupting operation of UE 110) in order to determine whether a proximity threshold has been met. If so, UE 110 may generate and send an arrival notification. The process may receive (at 820) a response from UE 110. The response may include an arrival notification, a response indicating that no proximity threshold has been met, and/or no response may be received if an arrival notification is not generated.

Process 800 may determine (at 830) whether a proximity threshold has been met. Such a determination may be made based on the response received from UE 110 (e.g., whether the response includes an arrival notification). In some embodiments, the response may include the UE location and the process may calculate the associated distance(s) in order to determine whether a proximity distance threshold has been met.

If the process determines (at 830) that no proximity threshold has been met, the process may determine (at 840) whether a maximum number of push or wake attempts has been reached. Such a maximum number of attempts may be specified in various appropriate ways (e.g., default value, user selection, etc.). If the process determines (at 840) that the maximum number of attempts has not been reached, the process may wait (at 850) a specified time interval and then send (at 810) another background push message. If the process determines (at 840) that the maximum number of attempts has been reached, the process may discontinue (at 860) push messaging.

If the process determines (at 830) that a proximity threshold has been met, the process may send (at 870) a notification message to UE 110. MCM 120 may generate a response using a process such as process 1000 described below.

Figure 9:
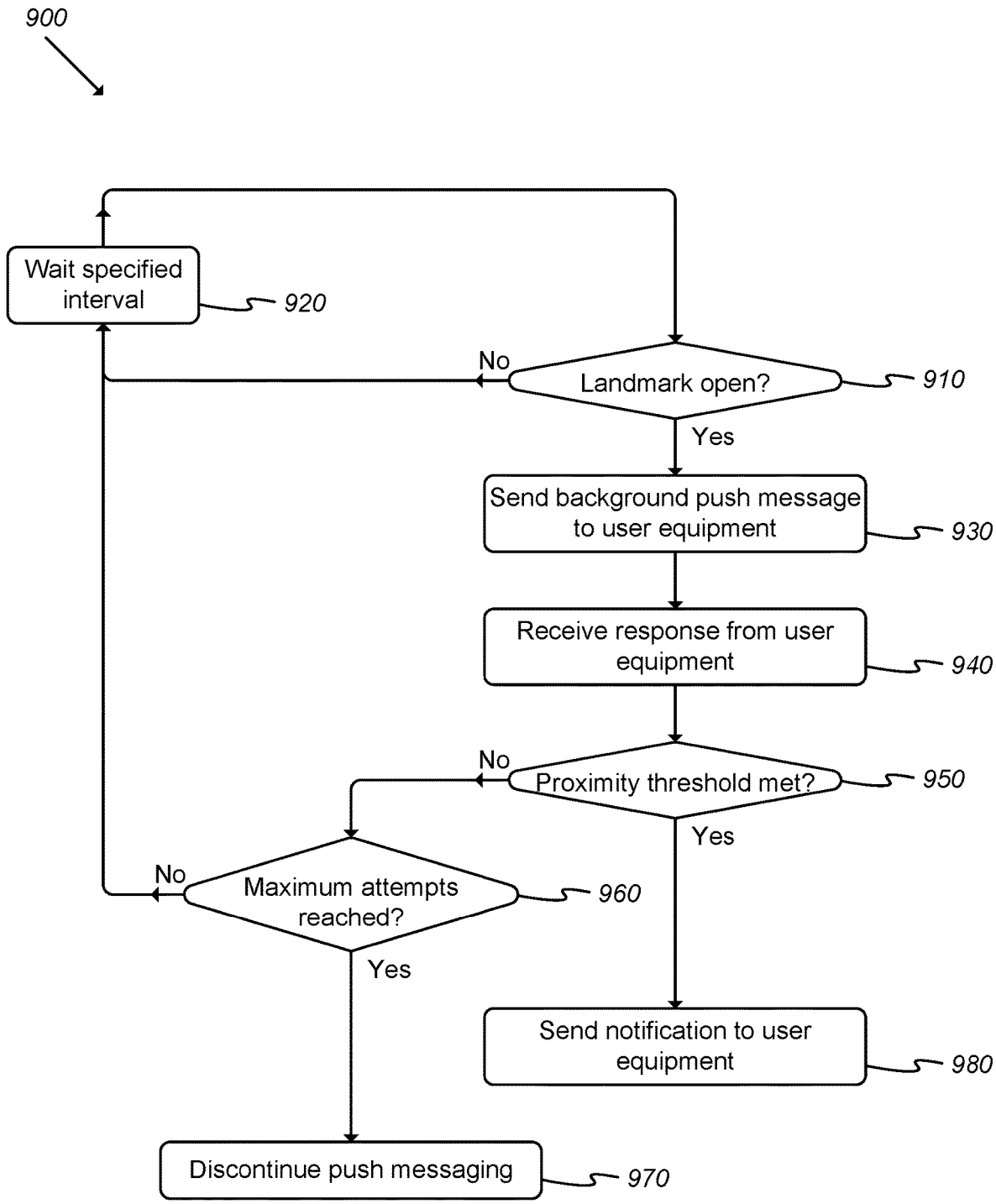
FIG. 9 illustrates an example process by which wakeup messages are generated and sent to a UE based on a proximity event detected outside operating hours.

FIG. 9 illustrates an example process 900 by which wakeup messages are generated and sent to a UE based on a proximity event detected outside operating hours. As described herein, MCM 120 may send a wakeup message to a UE that has been associated with an arrival or dwell event at a particular landmark outside operating hours. Process 900 may be performed when an arrival or dwell event associated with a local landmark geofence of some embodiments is identified but the landmark is not open or otherwise is unable to provide services and/or at other appropriate times. In some embodiments, process 900 may be performed by MCM 120. In some embodiments, process 900 may be performed by one or more other devices in addition to, or in lieu of, MCM 120. Furthermore, in some embodiments a complementary process may be performed by other devices, such as UE 110, landmark resources 410, etc.

As shown, process 900 may include determining (at 910) whether the landmark is open. Such a determination may be made by comparing a current time to an opening time of the landmark. If an arrival or dwell notification is received and the process determines (at 910) that the landmark is not open, the process may wait (at 920) some specified interval, which may initially be set to the time until the landmark opens. In some embodiments, a notification indicating the opening time may be sent.

If the process determines (at 910) that the landmark is open, the process may send (at 930) a background push message to UE 110. The background push message may include a payload that includes a landmark identifier and/or information related to the geofence under consideration.

The push message may be received at UE 110, where a client application of some embodiments may poll UE 110 location in the background (i.e., without notifying the user or disrupting operation of UE 110) in order to determine whether a proximity threshold has been met. If so, UE 110 may generate and send an arrival notification. The process may receive (at 940) a response from UE 110. The response may include an arrival notification, a response indicating that no proximity threshold has been met, and/or no response may be received if an arrival notification is not generated.

Process 900 may determine (at 950) whether a proximity threshold has been met. Such a determination may be made based on the response received from UE 110 (e.g., whether the response includes an arrival notification). In some embodiments, the response may include the UE location and the process may calculate the associated distance(s) in order to determine whether a proximity distance threshold has been met.

If the process determines (at 950) that no proximity threshold has been met, the process may determine (at 960) whether a maximum number of push or wake attempts has been reached. Such a maximum number of attempts may be specified in various appropriate ways (e.g., default value, user selection, etc.). If the process determines (at 960) that the maximum number of attempts has not been reached, the process may wait (at 920) a specified time interval and then determine (at 920) whether the landmark is open. If the process determines (at 960) that the maximum number of attempts has been reached, the process may discontinue (at 970) push messaging.

If the process determines (at 960) that a proximity threshold has been met, the process may send (at 980) a notification message to UE 110. MCM 120 may generate a response using a process such as process 1000 described below.

Figure 10:
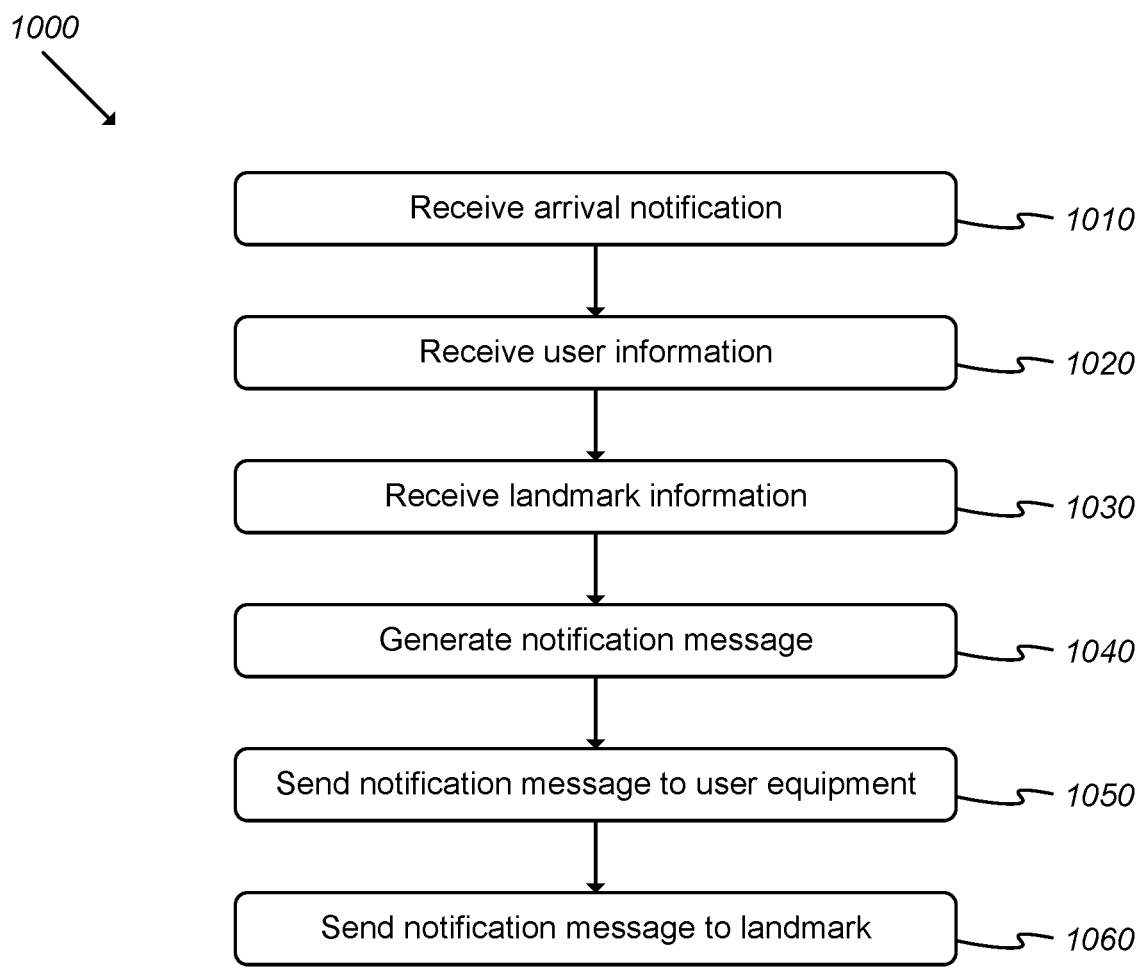
FIG. 10 illustrates an example process by which notification messages are generated and sent based on arrival at a landmark.

FIG. 10 illustrates an example process 1000 by which notification messages are generated and sent based on arrival at a landmark. As described herein, MCM 120 may generate one or more notification messages when an arrival event is identified at a particular landmark. Process 1000 may be performed when a minimum threshold distance between a UE and a landmark reference point is met and an arrival event is identified. In some embodiments, process 1000 may be performed by MCM 120. In some embodiments, process 1000 may be performed by one or more other devices in addition to, or in lieu of, MCM 120. Furthermore, in some embodiments a complementary process may be performed by other devices, such as UE 110, landmark resources 410, etc.

As shown, process 1000 may include receiving (at 1010) an arrival notification. Such an arrival notification may be received from a UE 110 and may be generated using a process such as process 600, 700, 800, or 900. The arrival notification may include information such as landmark identifier, event time, reference point associated with the arrival, and/or other appropriate information.

The process may include receiving (at 1020) user information. Such user information may be included in the arrival notification, or may be accessed using information supplied therein. Such user information may include, for instance, merchant account information, payment information, demographic data, etc.

Process 1000 may receive (at 1030) landmark information. Such information may include offers or content associated with the landmark, news or highlights related to the landmark, and/or other information. The landmark information may be received from a resource such as landmark resource 410. For instance, user information may be provided via an application programming interface ("API") or other appropriate resource and user-specific landmark information (e.g., reward account balances, account status, etc.) may be retrieved.

The process may include generating (at 1040) a notification message. The notification message may be generated based on the received arrival information, user information, and/or landmark information. The notification message may include advertisements, offers, coupons, media content, and/or other relevant information. In addition to, or in place of, a user notification message, some embodiments may generate a landmark notification message. Such a message may include information related to the user (e.g., current location, shopping list, credit balance, reward status, etc.).

Process 1000 may send (at 1050) the notification message to the user equipment. The message may be sent as a push message, short message service ("SMS"), email, and/or other appropriate formats for UE 110. The format may be selected based on various appropriate criteria (e.g., user selection, client application permissions, default value, type of notification, notification content, etc.).

The process may send (at 1060) a notification message to the landmark. Such a message may be sent to landmark resource 410. As above, the message may be sent as a push message, short message service ("SMS"), email, and/or other appropriate formats for the landmark resource. The format may be selected based on various appropriate criteria (e.g., user selection, client application permissions, default value, type of notification, notification content, etc.).

Figure 11:
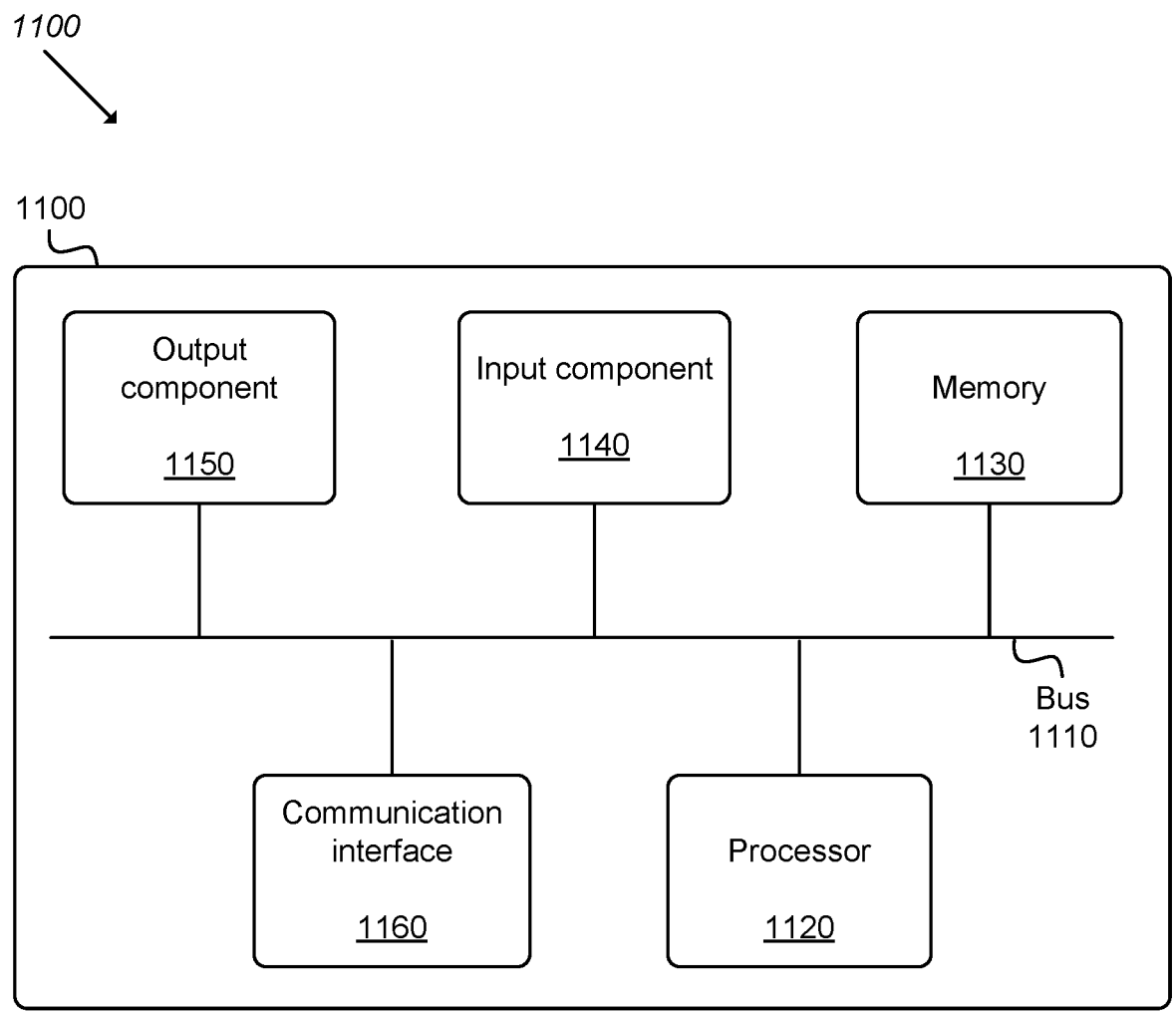
FIG. 11 illustrates example components of one or more devices, according to one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description but is not intended to be exhaustive or to limit the possible implementations to the precise form disclosed. Modifications and variations are possible in light of the above disclosure or may be acquired from practice of the implementations.

For example, while series of blocks have been described with regard to FIGS. 5-10, the order of the blocks may be modified in other implementations. Further, non-dependent blocks may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that, the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or,"

as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A User Equipment ("UE"), comprising:
one or more processors configured to:
receive information indicating a plurality of landmarks, the information for each landmark including:
a respective geofence associated with the each landmark, and
a reference point associated with the each landmark;
monitor a location of the UE at a first interval;
determine, based on the information indicating the geofences associated with the plurality of landmarks and further based on monitoring the location of the UE, that the UE has moved from a first location outside of a particular geofence associated with a particular landmark to a second location within the particular geofence associated with the particular landmark;
monitor the location of the UE at a second interval based on determining that the UE has moved from outside of the particular geofence to the second location within the particular geofence, wherein the second interval is different from the first interval;
determine, based on the monitoring at the second interval and after the UE has moved to the second location, a third location associated with the UE;
determine that the second and third locations are at least a threshold distance away from the reference point associated with the particular landmark;
based on determining that the second and third locations are at least the threshold distance away from the reference point associated with the particular landmark:
output a dwell notification indicating that the UE has entered the respective geofence and has been located at least the threshold distance away from the reference point associated with the particular landmark; and
cease monitoring the location of the UE at the second interval;
receive, in response to the dwell notification, a set of push messages, the set of push messages being sent at a third interval that is different from the second interval;
monitor the location of the UE at the third interval;
generate information indicating an outer boundary geofence associated with the plurality of landmarks;
determine, based on the information indicating the outer boundary geofence associated with the plurality of landmarks and further based on monitoring the location of the UE, that the location of the UE is outside the outer boundary geofence associated with the plurality of landmarks; and
based on determining that the location of the UE is outside the outer boundary geofence associated with the plurality of landmarks, send, to a mobile client manager, a request for landmarks, the request comprising the location of the UE and a range of interest.

2. The UE of claim 1, wherein the second interval is less than the first interval.

3. The UE of claim 1, wherein the one or more processors are further configured to:
send the dwell notification to a mobile client manager; and
receive a response from the mobile client manager, the response comprising the push message.

4. The UE of claim 1, wherein the one or more processors are further configured to:
determine that the third location is less than a threshold distance away from the reference point associated with the particular landmark;
based on determining that the third location is less than the threshold distance away from the reference point associated with the particular landmark:
output an arrival notification indicating that the UE is located less than the threshold distance away from the reference point associated with the particular landmark; and
cease monitoring the location of the UE at the second interval.

5. The UE of claim 4, wherein the one or more processors are further configured to:
send the arrival notification to a mobile client manager; and
receive a response from the mobile client manager, the response comprising information related to the particular landmark.

6. The UE of claim 1, wherein the one or more processors are further configured to:
receive, in response to the request for landmarks, information indicating an updated plurality of landmarks, the information for each updated landmark including:
a respective geofence associated with the each updated landmark, and
a reference point associated with the each updated landmark.

7. A non-transitory computer-readable medium, storing a set of processor-executable instructions to:
receive information indicating a plurality of landmarks, the information for each landmark including:
a respective geofence associated with the each landmark, and
a reference point associated with the each landmark;
monitor a location of the UE at a first interval;
determine, based on the information indicating the geofences associated with the plurality of landmarks and further based on monitoring the location of the UE, that the UE has moved from a first location outside of a particular geofence associated with a particular landmark to a second location within the particular geofence associated with the particular landmark;
monitor the location of the UE at a second interval based on determining that the UE has moved from outside of the particular geofence to the second location within the particular geofence, wherein the second interval is different from the first interval;
determine, based on the monitoring at the second interval and after the UE has moved to the second location, a third location associated with the UE;
determine that the second and third locations are at least a threshold distance away from the reference point associated with the particular landmark;
based on determining that the second and third locations are at least the threshold distance away from the reference point associated with the particular landmark:

output a dwell notification indicating that the UE has entered the respective geofence and has been located at least the threshold distance away from the reference point associated with the particular landmark; and
cease monitoring the location of the UE at the second interval;
receive, in response to the dwell notification, a set of push messages, the set of push messages being sent at a third interval that is different from the second interval;
monitor the location of the UE at the third interval;
generate information indicating an outer boundary geofence associated with the plurality of landmarks;
determine, based on the information indicating the outer boundary geofence associated with the plurality of landmarks and further based on monitoring the location of the UE, that the location of the UE is outside the outer boundary geofence associated with the plurality of landmarks; and
based on determining that the location of the UE is outside the outer boundary geofence associated with the plurality of landmarks, send, to a mobile client manager, a request for landmarks, the request comprising the location of the UE and a range of interest.

8. The non-transitory computer-readable medium of claim 7, wherein the second interval is less than the first interval.

9. The non-transitory computer-readable medium of claim 7, wherein the set of processor-executable instructions are further to:
send the dwell notification to a mobile client manager; and
receive a response from the mobile client manager, the response comprising the push message.

10. The non-transitory computer-readable medium of claim 7, wherein the set of processor-executable instructions are further to:
determine that the third location is not at least a threshold distance away from the reference point associated with the particular landmark;
based on determining that the third location is not at least the threshold distance away from the reference point associated with the particular landmark:
output an arrival notification indicating that the UE is located within the threshold distance away from the reference point associated with the particular landmark; and
cease monitoring the location of the UE at the second interval.

11. The non-transitory computer-readable medium of claim 10, wherein the set of processor-executable instructions are further to:
send the arrival notification to a mobile client manager; and
receive a response from the mobile client manager, the response comprising information related to the particular landmark.

12. The non-transitory computer-readable medium of claim 7, wherein the set of processor-executable instructions are further to:
receive, in response to the request for landmarks, information indicating an updated plurality of landmarks, the information for each updated landmark including:
a respective geofence associated with the each updated landmark, and
a reference point associated with the each updated landmark.

13. A method, comprising:
receiving information indicating a plurality of landmarks, the information for each landmark including:
a respective geofence associated with the each landmark, and
a reference point associated with the each landmark;
monitoring a location of a User Equipment ("UE") at a first interval;
determining, based on the information indicating the geofences associated with the plurality of landmarks and further based on monitoring the location of the UE, that the UE has moved from a first location outside of a particular geofence associated with a particular landmark to a second location within the particular geofence associated with the particular landmark;
monitoring the location of the UE at a second interval based on determining that the UE has moved from outside of the particular geofence to the second location within the particular geofence, wherein the second interval is different from the first interval;
determining, based on the monitoring at the second interval and after the UE has moved to the second location, a third location associated with the UE;
determining that the second and third locations are at least a threshold distance away from the reference point associated with the particular landmark;
based on determining that the second and third locations are at least the threshold distance away from the reference point associated with the particular landmark:
outputting a dwell notification indicating that the UE has entered the respective geofence and has been located at least the threshold distance away from the reference point associated with the particular landmark; and
ceasing monitoring the location of the UE at the second interval;
receiving, in response to the dwell notification, a set of push messages, the set of push messages being sent at a third interval that is different from the second interval;
monitoring the location of the UE at the third interval;
generating information indicating an outer boundary geofence associated with the plurality of landmarks;
determining, based on the information indicating the outer boundary geofence associated with the plurality of landmarks and further based on monitoring the location of the UE, that the location of the UE is outside the outer boundary geofence associated with the plurality of landmarks; and
based on determining that the location of the UE is outside the outer boundary geofence associated with the plurality of landmarks, outputting a request for landmarks, the request comprising the location of the UE.

14. The method of claim 13, wherein the second interval is less than the first interval.

15. The method of claim 13 further comprising:
sending the dwell notification to a mobile client manager; and
receiving a response from the mobile client manager, the response comprising the push message.

16. The method of claim 13 further comprising:
determining that the third location is not at least a threshold distance away from the reference point associated with the particular landmark;
based on determining that the third location is not at least the threshold distance away from the reference point associated with the particular landmark:

outputting an arrival notification indicating that the UE is located within the threshold distance away from the reference point associated with the particular landmark; and ceasing monitoring the location of the UE at the second interval.

17. The method of claim 16 further comprising:

sending the arrival notification to a mobile client manager; and receiving a response from the mobile client manager, the response comprising information related to the particular landmark.

18. The method of claim 16, wherein the request further includes a range of interest.

19. The method of claim 16, wherein outputting the request includes outputting the request to a mobile client manager.

20. The method of claim 16 further comprising:

receiving, in response to the request for landmarks, information indicating an updated plurality of landmarks, the information for each updated landmark including:
  a respective geofence associated with the each updated landmark, and
  a reference point associated with the each updated landmark.

* * * * *